US012423709B2

(12) United States Patent
Singhal

(10) Patent No.: US 12,423,709 B2
(45) Date of Patent: Sep. 23, 2025

(54) SYSTEM OF SECURITY THAT PREVENTS ABUSE OF IDENTITY DATA IN GLOBAL COMMERCE VIA MOBILE WIRELESS AUTHORIZATIONS

(76) Inventor: Tara Chand Singhal, Torrance, CA (US)

( * ) Notice: Subject to any disclaimer, the term of this patent is extended or adjusted under 35 U.S.C. 154(b) by 530 days.

(21) Appl. No.: 12/384,718

(22) Filed: Apr. 8, 2009

(65) Prior Publication Data

US 2010/0229245 A1 Sep. 9, 2010

Related U.S. Application Data

(60) Provisional application No. 61/209,388, filed on Mar. 5, 2009.

(51) Int. Cl.
*G06Q 20/42* (2012.01)
*G06Q 20/40* (2012.01)
(Continued)

(52) U.S. Cl.
CPC ........... *G06Q 20/425* (2013.01); *G06Q 20/40* (2013.01); *H04L 9/321* (2013.01); *H04L 9/3226* (2013.01);
(Continued)

(58) Field of Classification Search
CPC .............................................. G06Q 20/40–49
(Continued)

(56) References Cited

U.S. PATENT DOCUMENTS 5,961,593 A * 10/1999 Gabber ................. H04L 67/565
713/153

6,097,962 A * 8/2000 Corriveau ............... H04W 4/14
455/445

(Continued)

FOREIGN PATENT DOCUMENTS

CA 2602941 * 3/2006 ............. G06Q 40/00
CA 2602941 A1 * 3/2006 ............. G06Q 40/00

OTHER PUBLICATIONS

"SecureSMSPay: Secure SMS Mobile Payent Model" Hany Harb, Hassan Farahat, and Mohamed Ezz Systems and Computers Engineering, Faculty of Engineering Al Azhar University (Aug. 2008) Published in: 2008 2nd International Conference on Anti-counterfeiting, Security and Identification (pp. 11-17) (Year: 2008).*

(Continued)

*Primary Examiner* — John W Hayes
*Assistant Examiner* — Cristina Owen Sherr
(74) *Attorney, Agent, or Firm* — Kasha Law LLC; John R. Kasha; Kelly L. Kasha

(57) ABSTRACT

A system of security that prevents misuse of identity data of an identity data owner in an identity data driven transaction in a global commerce network, that has in the system, a transaction processing entity that after it receives a identity data driven transaction from a transaction initiating entity, puts on hold the processing of the transaction for a period of time and via the identity data owner's wireless mobile communication device, contacts the identity data owner for authorization of the transaction before the transaction processing is completed. The system of security for identity data may be used in the identity data driven transaction is one from a group of (i) credit card payment, (ii) bank account payment, (iii) release of credit profile, (iv) release of financial data, and (v) release of medical data.

34 Claims, 12 Drawing Sheets

(51) Int. Cl.
*H04L 9/32* (2006.01)
*H04L 9/40* (2022.01)
*H04W 12/06* (2021.01)
*H04W 4/14* (2009.01)

(52) U.S. Cl.
CPC .......... *H04L 9/3271* (2013.01); *H04L 63/083* (2013.01); *H04L 63/102* (2013.01); *H04W 12/06* (2013.01); *H04L 2209/56* (2013.01); *H04L 2209/80* (2013.01); *H04W 4/14* (2013.01)

(58) Field of Classification Search
USPC .............................................. 725/28; 726/28
See application file for complete search history.

(56) References Cited

U.S. PATENT DOCUMENTS

| | | | | |
|---|---|---|---|---|
| 6,553,110 | B1* | 4/2003 | Peng | H04M 3/42059 379/142.02 |
| 6,862,573 | B2* | 3/2005 | Kendall | G06Q 20/401 705/7.11 |
| 7,027,808 | B2* | 4/2006 | Wesby | H04L 67/10 455/423 |
| 2002/0008503 | A1* | 1/2002 | Bucksch | G11C 29/50012 324/76.54 |
| 2002/0046185 | A1* | 4/2002 | Villart | G06Q 30/06 705/64 |
| 2002/0143634 | A1* | 10/2002 | Kumar | G06Q 20/403 705/26.1 |
| 2003/0028481 | A1* | 2/2003 | Flitcroft | G06Q 20/34 705/39 |
| 2004/0019564 | A1* | 1/2004 | Goldthwaite | G06Q 20/425 705/44 |
| 2007/0198410 | A1* | 8/2007 | Labgold | G06Q 20/04 705/44 |
| 2007/0244811 | A1* | 10/2007 | Tumminaro | G06Q 20/223 705/39 |
| 2008/0127311 | A1* | 5/2008 | Yasaki | G06F 21/35 726/4 |
| 2009/0164354 | A1 | 6/2009 | Ledbetter et al. | |
| 2009/0167553 | A1* | 7/2009 | Hong | G06Q 50/12 340/4.61 |
| 2009/0313165 | A1 | 12/2009 | Walter | |

OTHER PUBLICATIONS

"SecureSMSPay: Secure SMS Mobile Payent Model" Hany, Hassant, and Mohamed Ezz Systems and Computers Engineering, Al Azhar University (Aug. 2008) Published in: 2008 2nd International Conference on Anti-counterfeiting, Security and Identification(pp. 11-17) 2008.*

"SecureSMSPay: Secure SMS Mobile Payent Model" Hany, Hassant, and Mohamed Ezz Systems and Computers Engineering, Al Azhar University (Aug. 2008) Published in: 2008 2nd International Conference on Anti-counterfeiting, Security and Identification(pp. 11-17) 2008 (Year: 2008).*

* cited by examiner

| Unique Customer Identifier 75 | S/N | Mobile Number | social sec # | contact info | Service choice 77 | security code 80 | enable/ disable 79 |
|---|---|---|---|---|---|---|---|
| | | | | | | | |

66

| Unique Customer Identifier 75 | S/N | Mobile Number | Bankcards Bank Acts | contact info | service choice 77 | security code 80 | enable/ disable 79 |
|---|---|---|---|---|---|---|---|
| | | | | | | | |

| Unique Customer Identifier 75 | S/N | Social Number | Service choice 77 | enable/ disable 79 |
|---|---|---|---|---|
| | | | Yes/no | |

81

| Unique Customer Identifier 75 | S/N | Bankcards | Bank accounts | service choice 77 | enable/ disable 79 |
|---|---|---|---|---|---|
| | | | | Yes/no | |

| MAS Process for Data Aggregators |
|---|
| Receive a request for data release 122 |
| Put release of data processing on hold, Send SMS query to MAS 124 |
| Await response from MAS server and resume data release processing 126 |

Figure 7B

| MAS Process for Financial Institutions |
|---|
| Receive a request for payment authorization 100 |
| Check mobile security service selected 102 |
| Put authorization processing on hold and initiate a timer 104 |
| Send SMS query to mobile MAS server 106 |
| Await response from MAS server 108 |
| Set timer for this transaction type 110 |
| Process payment without customer contact 112 |
| Eliminate id proof at POS 114 |
| Eliminate PIN entry at POS 116 |
| Contact customer via SMS for a return response 118 |
| Levying a security fee 120 |

Figure 7A

| |
|---|
| An id data owner is concerned for misuse of his id data, and decided to use MAS service for a service fee, for his/her piece of mind. 140 |
| Id data owner open an account with the MAS by providing mobile contact, and other basic information that supports identity verification. 142 |
| Id data owner authorizes MAS as its agent to require id data transaction processing entities to contact MAS for authorizations on their accounts. 144 |
| MAS verifies the identity and creates an account with a customer identifier. 146 |
| MAS contacts the various process entities which maintain customer bank data and credit data 148 |
| Process entities amend their system, to add MAS provided customer identifier and a service choice flag and by establishing an interface with the MAS. 150 |
| Id data owner has ability to interact with the MAS via secure means to turn MAS flag on/off. 152 |
| Process entity receives a transaction and checks service choice flag. 154 |
| Process entity interfaces with the MAS by sending a record, having, customer identifier, nature and type of transaction and request entity identifier. 156 |
| MAS receives the record, and searches the customer identifier and finds the customer mobile contact information. MAS checks enable/disable flag. 158 |
| If enable, MAS forms a mobile authorization record, initiates a timer, and sends a SMS to id data owner mobile, if disable, MAS sends an advisory SMS. 160 |
| If flag enable, MAS awaits for response and creates a accept/reject record for the process entity and sends the record to the process entity. 162 |
| MAS makes a log event record of the process. 164 |

Figure 8

SYSTEM OF SECURITY THAT PREVENTS ABUSE OF IDENTITY DATA IN GLOBAL COMMERCE VIA MOBILE WIRELESS AUTHORIZATIONS

CROSS REFERENCE TO RELATED APPLICATIONS

This application claims priority on Provisional Application Ser. No. 61/209,388, entitled "System Of Security That Prevents Abuse Of Identity Data Via Mobile Wireless Authorizations In Global Commerce" filed on Mar. 5, 2009, by Tara Chand Singhal. The contents of Provisional Application Ser. No. 61/209,388 are incorporated herein by reference.

FIELD OF THE INVENTION

The preferred embodiment is on a system of security that prevents abuse of identity data in identity data driven transactions in global commerce via mobile wireless authorizations.

BACKGROUND

The global commerce using electronic global computer networks relies on use of identity data for a range of identity data driven transactions such as, release of a credit profile to a request initiating entity for loan and employment applications, payment request on checking accounts via checks and equivalent debit cards from payees, and payment request via credit cards from merchants via their point of sale systems. The global commerce using electronic global computer networks also relies on use of identity data, for an identity data driven transaction for other purposes, such as release of medical and financial data from data aggregators to insurance and other service providers.

In such identity data driven transactions, the identity data owner's identity data is pre-stored in the transaction processing entity systems and is used when the identity data driven transactions are initiated by the transaction initiating entities for the identity data owner. The identity data owner is remote from the transaction processing entity and it is extremely difficult if not impossible for them to verify the authenticity of the transaction, as initiated by a transaction initiating entity. Others can and do initiate transactions by impersonating the identity data owner by theft and then abusing and misusing the identity data.

The impact of the theft of identity data and misuse and abuse of the identity data by others, on the id data owner, the banks, and the merchants is described in the following two news stories. One story highlights the impact of id theft on online commerce and the other story highlights the impact on the victims of identity theft.

Due to the high rate of returns and fraud online businesses that conduct B2C transactions on the Internet pay a premium for processing fees. This premium is usually 20% higher than their offline counterparts. There is also an additional reserve fee, which is temporarily withheld from each transaction (3-5% up to 30 days). Why are these fees so high, in comparison to offline transactions? The main reason is that security is "reduced" due to the lack of physical presence and identity verification by the online merchant. Identity theft and fraud are easier to commit online.

Currently online credit card fraud rates are three times higher than off-line transactions. CNP, card not present transactions leverage the same processing infrastructure as regular in-person credit card transactions. Once the transaction information is passed through the "gateway" payment processor, the transaction is processed using the same ETF/ACH rules as other electronic transfers. Therefore the focus of security and privacy policy must be on the "front-end" of the transaction. Security, authentication and privacy protection must be strong at the point of sale, the merchant web site.

The worst issue for a vendor is to deal with re "unexplained" charges to a customer's account. These issues not only cost the vendor money and time to resolve. They erode customer confidence and damage the customer relationship.

As another news story for illustration of the impact of the identity theft on victims is from LA Times by Patti Morrison, titled, Identity theft hits close to home, Mar. 12, 2009. When someone steals your mail, it's a whole new worrisome world. Add me to the thousands of victims of identity theft (313,982 reported last year, according to the Federal Trade Commission). Although in my case, it's still potential identity theft, and I'm spending a lot of time and money to keep it that way.

Last week, someone drilled the lock out of my mailbox and stole what was inside: the usual magazines and fliers, and a financial statement. Last year, I bought the locking box because of mail theft. Cops had stopped a truck loaded with stolen mail nearby. A thief swiped an unsolicited preprinted credit-card-with-checks envelope from a neighbor's box and went on a spending spree.

Now my mailbox is gaping open like Jerry Lewis' jaw. The irony is that I am pretty scrupulous about the personal numbers I flash around. I do no online banking—zero. My online shopping is confined to airline tickets, on a separate credit card. I pay cash for gas and everyday shopping.

So here all my precautions get undone by a thuggish break-and-enter mail theft. It has meant hours on the phone. I called the Postal Inspection Service, the CSI of the USPS, to report the break-in. "We've been getting so many reports about mail theft," one woman commiserated. I called my local post office to talk to the manager and to stop home mail delivery.

I called my credit card registry for one-call card cancellation. I called the credit union and the American Express credit monitoring service I'd signed up for a while ago. I went to my bank. I called Social Security, but they don't take reports on these matters. Only in extreme cases can you change your Social Security number—like going into the federal witness protection program.

Jonathan Fairtlough is assistant head deputy of the high-tech crimes division at the L.A. County D.A.'s office. Years ago, identity fraud wasn't taken too seriously. Now California has "some great laws," he tells me. There are slicker means of identity theft than mailbox break-ins, Fairtlough said. Skimming devices slipped into debit and credit card pay points at gas stations, or even in bank ATMs, snag your account and PIN. The thieves make fake cards and clean you out.

At the Sheriffs Department, Sgt. Bob Berardi is part of the identity theft detail. He apologized if he was talking too much—"I'm Italian"—but he had a lot to say. "It's very hard for most people to understand how devastating this can be . . . . The psychological effect stays with you forever. Someone has burglarized you, taken something from you, forced themselves into your life, and you have no idea what that impact is going to be, today, tomorrow or down the road."

Some matters are out of our control. Ask the poor clients of a Corona del Mar mortgage broker whose files ended up sitting out in the open at a recycling center last month—Social Security numbers, tax returns and all.

Berardi suggests you use your ATM card as a credit, not a debit card. That keeps your PIN from thieves. Make sure your computer security software is up to date. Don't fall for scams; that e-mail that looks like it came from your bank probably didn't. Pretend you're Oliver North and shred everything. Checking your credit is a wearisome task, but do it. I'll be doing it probably every week now—not for three months but for a year or more, because, as Fairtlough told me, thieves will wait until your vigilance slackens.

In the meantime, you business people and bureaucrats of the world, if someone purporting to be me tries to buy a Hummer, or if my name shows up on a passport in Peshawar—well, that is just so not me. Patti Morrison: Accept no substitutes.

When the identity data is so abused and misused, the bank, the data keeping entity, and the identity data owner all suffer adverse consequences. These adverse consequences include financial loss to the bank, loss to the vendor, loss of reputation, and the task of cleaning up the credit profile and reputation for the identity data owners at considerable trouble and expense.

Some banks use fraud monitoring systems based on the spending profile of their customer and contact the customer by telephone. Some service providers monitor credit profile for unusual transactions. While, some choose to lock the release of credit profile data entirely, for those whose identity data, is stolen or being suspected of having been stolen.

The current approaches of preventing misuse of the identity data are insufficient and mostly apply after the transaction has already occurred causing losses for the banks, losses to the vendors, and has created problems in cleaning up credit reputation for the identity data owners. Hence, better systems and approaches are needed.

It is the objective of the preferred embodiment to have a system for preventing abuse of identity data of the identity data owner in identity data driven transactions in global commerce that does not have the drawback as previously described here.

It is also the objective of the preferred embodiment to have the transaction processing entities have a system of authorization of the transaction from the identity data owner themselves before processing the transaction.

It is yet another objective of the preferred embodiment to prevent unauthorized identity data transactions of the identity data owner in identity data driven transactions in global commerce.

SUMMARY

In global commerce, there are many identity data driven transactions that depend upon the use of some one's personal identity data. These transactions may be characterized in two broad areas. One of these areas is payment transactions from a person's, credit card, debit card, and checking account that are maintained at a financial institution. The other broad area is release of personal data such as a credit profile that supports a loan and an employment application. Another broad area is release of medical and financial data.

The personal data is stored in computers of banks, merchants and governments and also data service providers who collect and aggregate data from multiple sources and sell to the government and businesses. Based on the pervasive news stories, large quantities of id data have already been stolen, and it is perceived as a matter of time before it is misused or abused, at an uncertain future time, making the theft of such data like a ticking time bomb for those whose identity data has been stolen or believed stolen.

One solution to protect against such theft of id data and the potential abuse and misuse is that the card issuing industry replaces the account numbers and issues new cards at their considerable expense. Another solution has been that the card issuing industry uses fraud alert systems based on a customer profile, where a transaction based on such a profile is flagged for human intervention by a banks' automated fraud agent. As yet another solution, the id data owner is told to monitor his/her credit profile for unauthorized transactions or requests for data.

Based on a large number of news stories, it has become easy for the thieves to misuse someone else's id data in a variety of ways. The preferred embodiment herein describes a system and method, that even after such id data is stolen the systems and method would prevent misuse and abuse of such id data. A system of security that prevents misuse of identity data of an identity data owner in an identity data driven transaction in a global commerce network is described here.

In the system of the preferred embodiment, a transaction processing entity, after it receives an identity data driven transaction from a transaction initiating entity, puts on hold the processing of the transaction for a period of time and via the identity data owner's wireless mobile communication device, contacts the identity data owner for authorization of the transaction before the transaction processing is allowed to complete.

The system uses and leverages the wide availability of mobile phones to contact their owners in real time via an SMS message for authorization of the identity data driven transaction. The system of security for identity data, using the mobile device authorization system may obviate the need for authorizations for the identity data driven transaction at the transaction initiating entities that require a signature, and additionally a proof of identity; as such approaches are not entirely satisfactory being dependent upon a merchant clerk to verify identity.

The system of security for identity data may be used in the identity data driven transactions from a group of (i) credit card payment, (ii) bank account payment, (iii) release of credit profile, (iv) release of financial data, and (v) release of medical data.

There are various modalities in how the system may be used to work within the existing systems of the holders of the identity data. In the system of security for identity data, a mobile authorization service provider may manage a database of mobile contact information and the corresponding mapping of identity data and provides a service to the transaction processing entities that facilitates the contact with the identity data owner for the authorizations. Alternatively, the transaction processing entity may themselves manage the mobile contact information.

The contact by the transaction processing entity or the mobile authorization service provider via the owner's wireless mobile communication device may include a SMS text message that embeds a pre-placed security code and may include sending to the identity data owner, (i) name of the transaction initiating entity, date and time, and optionally an amount for a payment transaction. The authorization may include accept, decline or time out due to lack of response, where the time out is set based on the type of the transaction. The system logs an authorization event in an event log database for use as an authorization record of the transaction.

The system may be operated as an optional fee based service for those identity data owners who wish to prevent unauthorized transaction using their identity data. Such an optional fee based system may have a service choice flag maintained in the data base of the transaction processing entities based on the request of their customers.

When the system's mobile authorization service is not required, the system may also have a second enable/disable flag that for periods of time disables the authorization system and enables it to process the transaction without using the mobile authorization service.

These and other aspects and features of the system that prevents abuse and misuse of identity data of an identity data owner in identity data driven transactions is described in detail with the help of accompanying drawings.

BRIEF DESCRIPTION OF THE DRAWINGS

Some of the novel features of this preferred embodiment will be best understood from the accompanying drawings, taken in conjunction with the accompanying description, in which similar reference characters refer to similar parts, and in which:

FIG. 4 is block diagrams that illustrates databases that may be used for the present preferred embodiment of mobile authorization service system.

FIG. 5 is a block diagram that illustrates databases that may be used for the present preferred embodiment of mobile authorization service system.

FIG. 7A-B is a method diagram that illustrates features of an embodiment of a mobile authorization service system.

FIG. 8 is a method diagram that illustrates features of the present preferred embodiment of a mobile authorization service system.

DESCRIPTION

Introduction

Figure 1A:
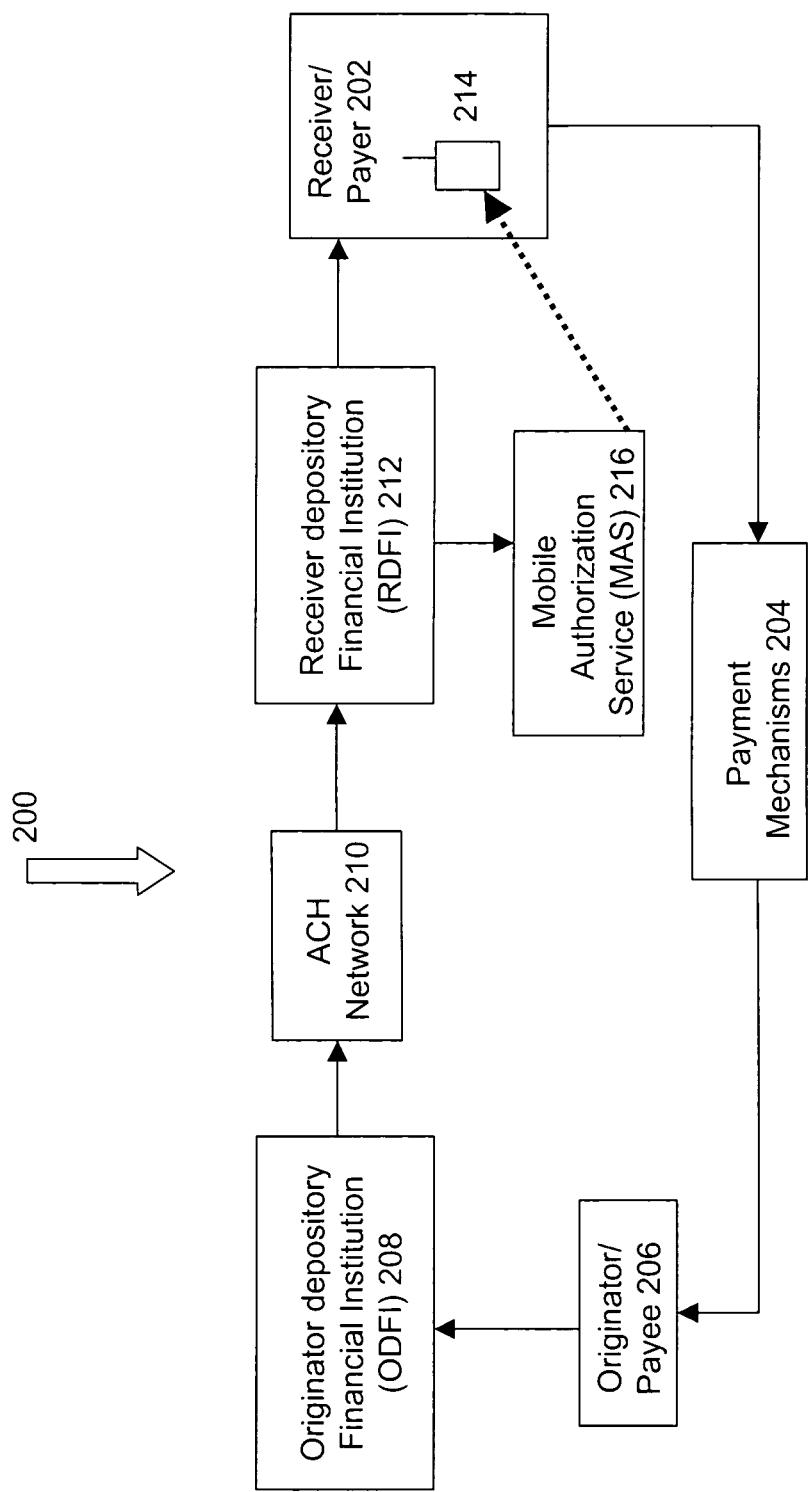
FIG. 1A is a block diagram that illustrates features of the present preferred embodiment of a mobile authorization service system for payment authorizations.

With reference to FIG. 1A, a prior art Automated Clearing House (ACH) financial transaction system 200 provides for a payer 202 (receiver in the ACH terminology), who by a payment mechanism 204 that may include a variety of forms, such as checks and bankcards, pays a payee 206, a merchant or a private party or service provider, (called originator in ACH terminology). The originator 206 with the financial data of the payee contacts his/her ODFI 208, who via the ACH network protocol 210 submits the transaction to the RDFI 212, the payer's bank, to authorize the transaction. The RDFI 212 verifies availability of the funds from the payer 202 account and sends a payment authorization or rejection as appropriate to the ODFI 208. The ODFI communicates such payment authorizations or rejections to the originator 206.

The RDFI 212 sends periodic account statements to the payer 202 by US mail or online banking means. The ACH rules, for the ODFI 208, require that the originator 206 have a written or verbal authorization for the transaction from the payer 202.

This prior art payment authorization system 200 requires an RDFI 212 to approve a payment relying solely on the ability of the originator 206 to have genuine authorizations from the payer 202. Based on published news items on identity data related fraud, anyone may impersonate and provide fraudulent authorizations on behalf of the payer 202, both for remote authorizations and in person authorizations, enabling payment to be authorized from his/her account without his/her knowledge.

The embodiment, as illustrated in FIG. 1A, described here for preventing abuse and misuse of the identity data, related to bank data in this situation, has a mobile authorization service (MAS) 216 that is contacted by the RDFI 212 to obtain real time authorization of the transaction from the payer 202 via his wireless mobile device 214.

Figure 1B:
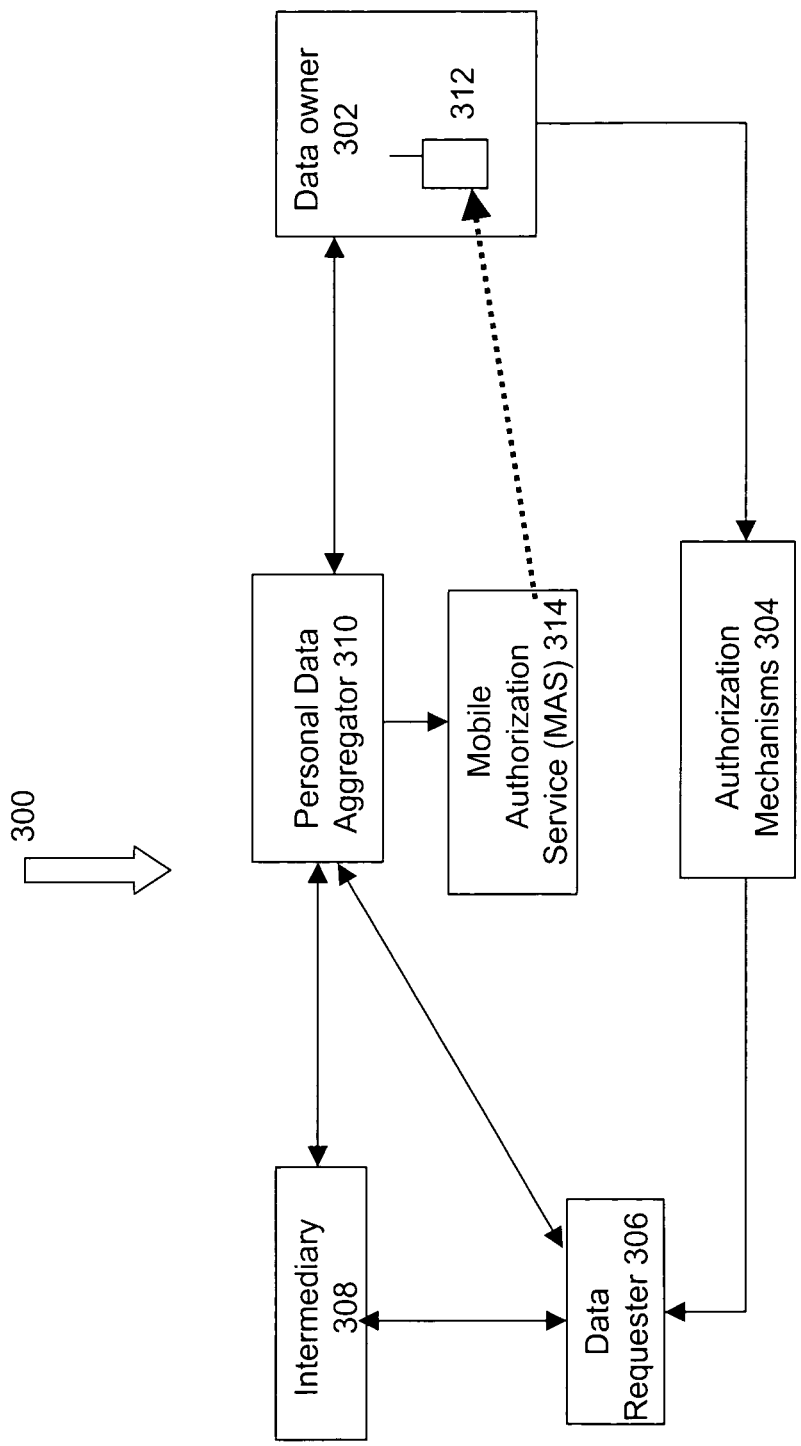
FIG. 1B is a block diagram that illustrates features of the present preferred embodiment of a mobile authorization service system for credit data release authorizations.

With reference to FIG. 1B, a prior art personal data system 300 provides for an identity data owner 302, who by an authorization mechanism 304 that may include a variety of forms, such as paper forms, online forms and verbal, provides a data requestor 306, a merchant or an employer or a service provider, an authorization to have a personal data aggregator 310 release identity data owner's personal data to the data requestor 306. The data requestor 306 directly or via an intermediary 308 submits the data release request to the data aggregator 310. The data aggregator 310 identifies the identity owner via a social security number and other backup data provided by the requester 306 and releases the personal data to the intermediary 308 and/or the data requester 306. In this system 300, the data aggregator 310 does not verify the authenticity of the request with the data owner 302. The data aggregator 310 may require that the data requester 306 have a written or verbal authorization for the data release from the data owner 302.

This prior art data release system 300 relies on the ability of the data requestor 306 to have genuine authorizations from the data owner 302. Based on published news items related to Identity data fraud, anyone may impersonate and provide fraudulent authorizations on behalf of the data owner 302.

The embodiment, as illustrated in FIG. 1B, described here for preventing abuse and misuse of the identity data, specifically release of the personal data in this situation, has a mobile authorization service 314 (MAS) that is contacted by the data aggregator 310 to obtain real time authorization of the data release transaction from the data owner 302 via his/her wireless mobile device 312. When the data owner him/her self wants to have the data released to him/her and contacts the data aggregator 310, the same MAS 314 may be used.

In implementing such a mobile authorization system, an id data owner, concerned for misuse of his id data, for his/her piece of mind decides to use MAS service for a service fee. The method steps for using MAS are described later in detail with reference to FIG. 8. They are summarized here. The id data owner opens an account with the MAS by providing mobile contact information, and other basic information that supports identity verification. The id data owners authorize MAS as their agent to require id data transaction processing entities, RDFI 212, as in FIG. 1A and data aggregators 310 as in FIG. 1B, to contact MAS 216 and 314 for authorizations on their accounts.

MAS verifies the identity and creates an account with a customer identifier. MAS contacts the various transaction processing entities which maintain customer bank data RDFI 212 and credit data 310. As a result of this request, the entities 212 and 310 amend their system by (i) adding in their databases, the MAS provided customer identifier and a service choice flag to facilitate identifying those who have chosen this service and those who have not, and (ii) by establishing an interface with the MAS.

Figure 9:
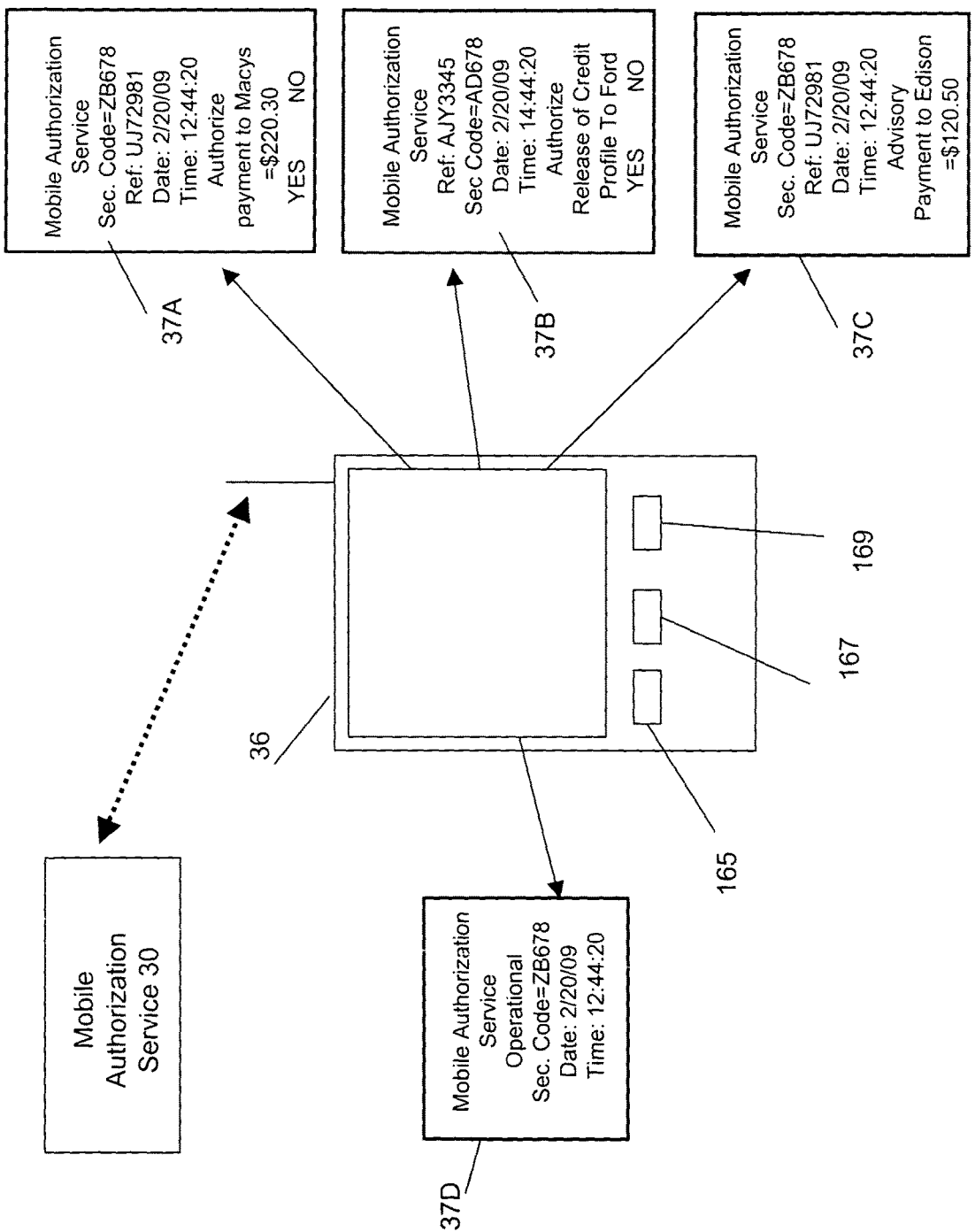
FIG. 9 is a block diagram that illustrates features of the present preferred embodiment of a mobile authorization service system.

As described later with reference to FIG. 9, the id data owner is provided the ability to interact with the MAS via secure means to turn a MAS enable flag on/off that enables the real time mobile authorizations to be turned off and on for reasons as described later in here. Prior art provides means for such secure means.

The RDFI 212 or the data aggregator 310 receives a transaction request and checks the status of the service choice flag in their databases. When the MAS service choice flag is set to yes, the transaction processing entities 212 and 310 in FIGS. 1A and 1B interface with the MAS 216, 314 and send an authorization request record. The authorization request record may have a customer identifier, nature and type of transaction, and originator name or data requester name. MAS 216, 314 receives the authorization request record and searches the customer identifier in its database and finds the corresponding customer mobile contact information. MAS checks in its database, the status of the authorization service enable/disable flag. If the flag is set to enable, MAS forms a mobile authorization short messaging system (SMS) protocol based text message, initiates a timer, and sends the SMS to the id data owner's wireless mobile device. If the flag is set to disable, MAS may send an advisory SMS related to the transaction or not send anything, based on customer preference. If flag is set to enable, MAS then waits for an accept/reject return response and then creates an accept/reject record for the transaction processing entity 212, 310 and sends the accept/reject record to the transaction processing entity 212, 310. MAS 216, 314 make a log event record of the authorization process.

A service fee may be charged for this service to support the operation of the MAS. The service fee may range in the five to fifteen dollars per month for this service and it is believed, such a service fee would be reasonable for the service of preventing abuse and misuse of id data owner's identity data. Such a flat fee or a fee based on per transaction may be charged from the identity data owner. Such a fee for this type of service for the benefits provided is considered reasonable based on similar fees being charged by other service providers who monitor credit profiles for suspicious activities. A part of this service fee may be shared with the data aggregator and RDFI for their cooperation in amending their systems to interface with the MAS.

A mobile authorization service customer may have multiple accounts with multiple financial entities and also has private identity data in multiple data aggregators such as, the three credit profilers, Equifax, Transunion, and Experian.

Figure 2A:
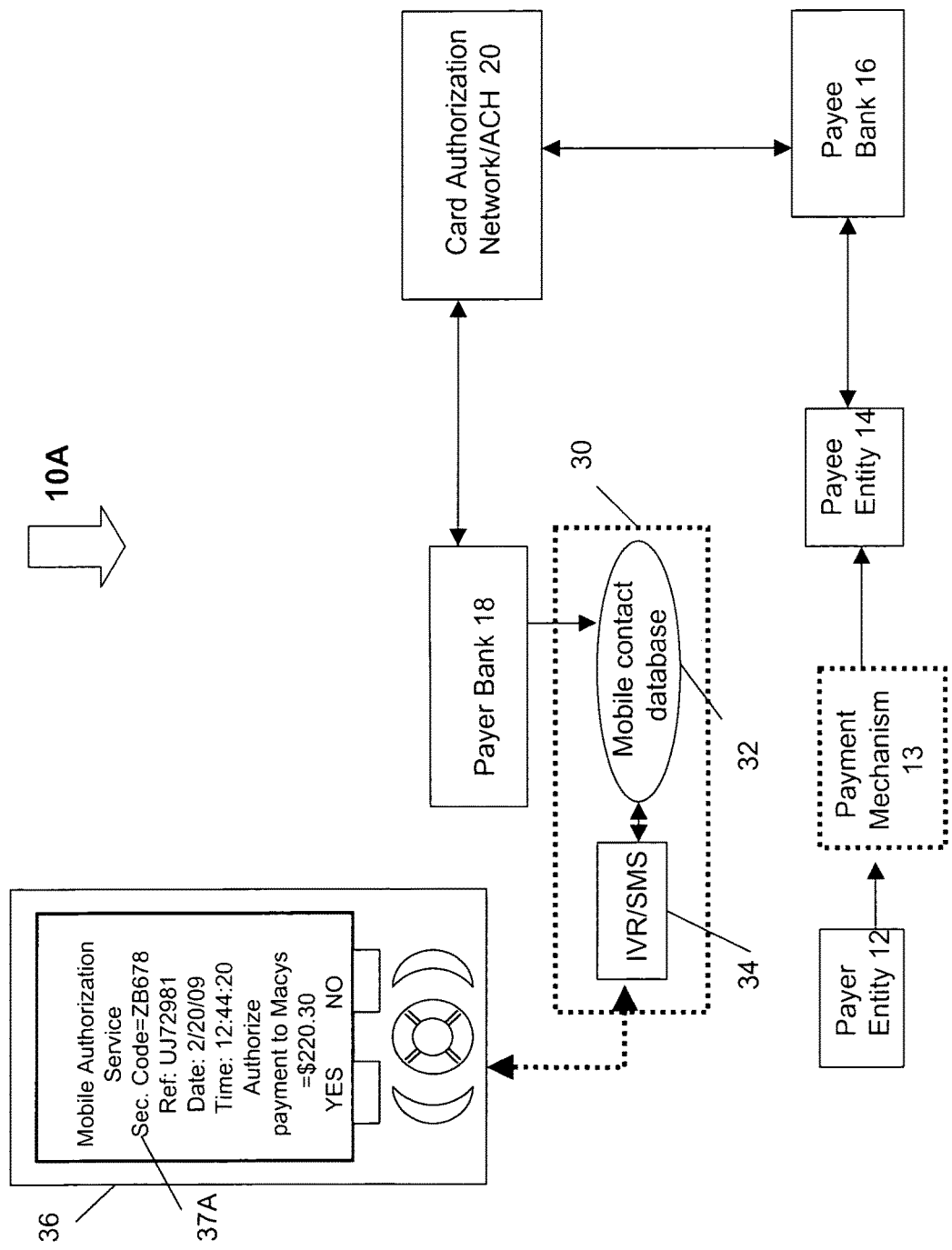
FIG. 2A is a block diagram that illustrates features of the present preferred embodiment of a mobile authorization service system for payment authorizations.
Figure 2B:
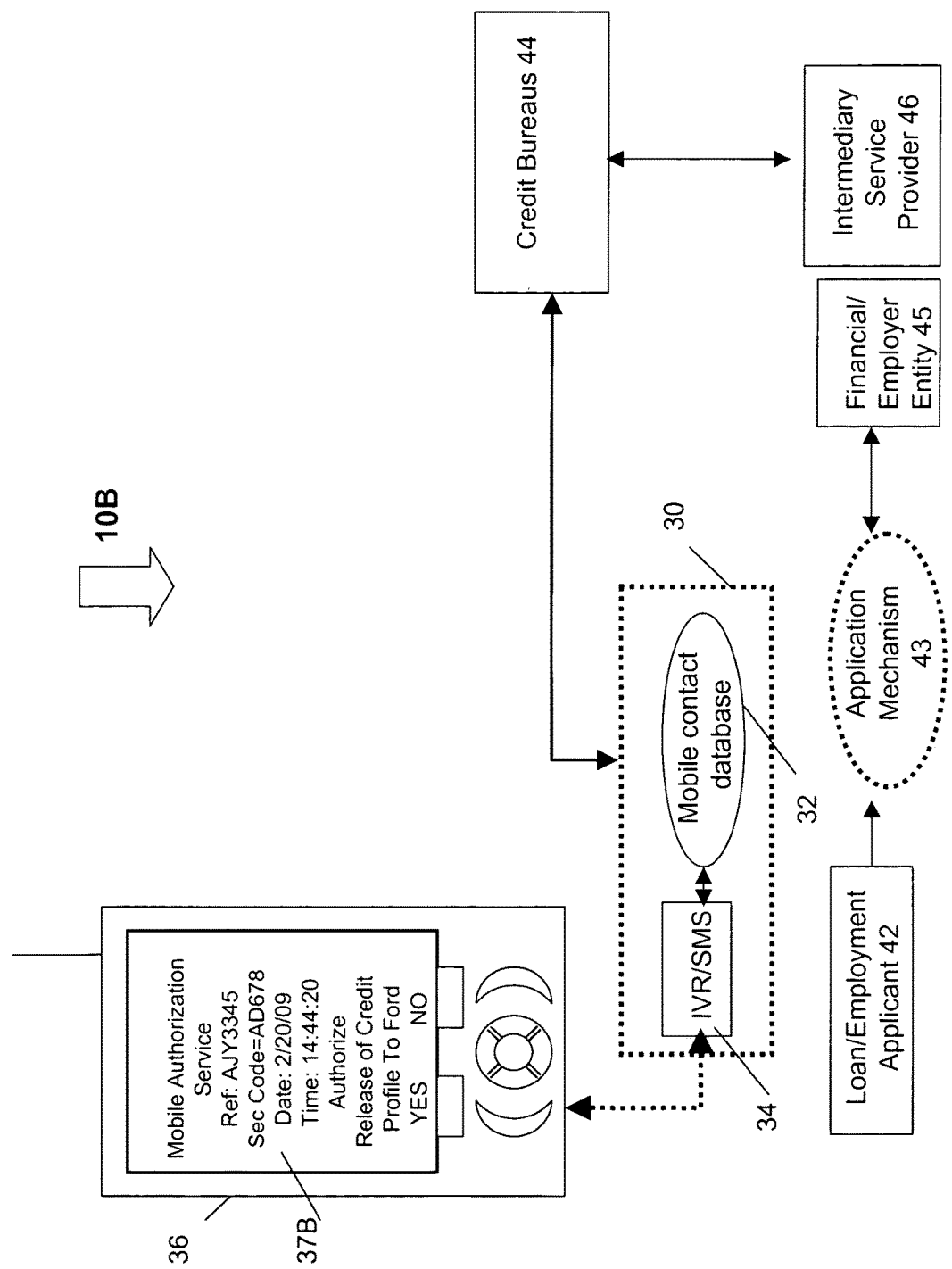
FIG. 2B is a block diagram that illustrates features of the present preferred embodiment of a mobile authorization service system for credit data release authorizations.

In a preferred embodiment, as illustrated in FIGS. 2A and 2B, a central MAS 30, in lieu of MAS 216 and MAS 314 may service all of these processing entities, as it would be more efficient for the customer to have one mobile authorization service, service all of his/her accounts. It would also be more efficient for the processing entities to have one mobile authorization service, instead of building and maintaining their own systems. Alternatively due to business and competitive reasons, large financial institutions, each of them may choose to offer their individual mobile authorization service to their customers.

Figure 10:
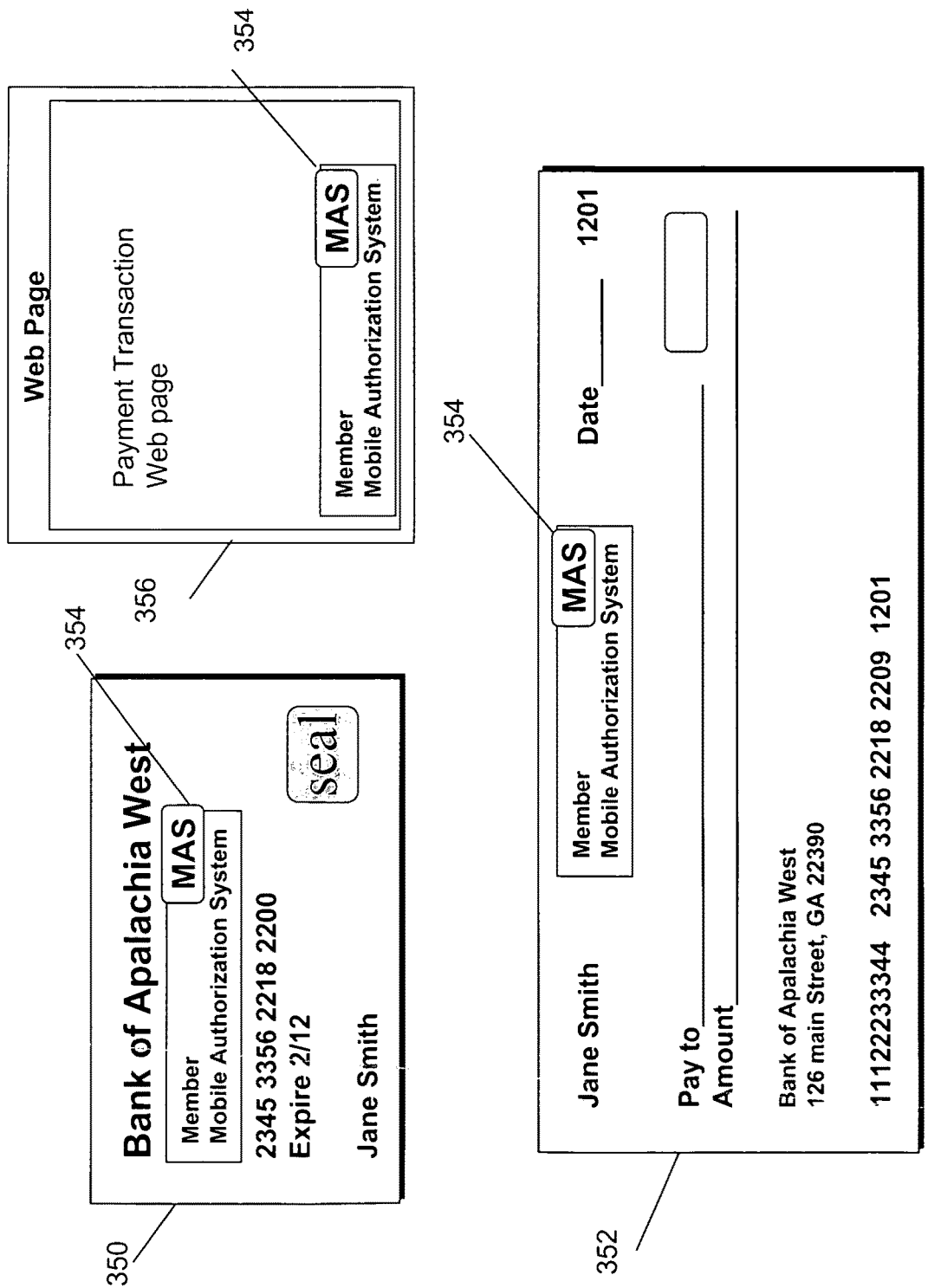
FIG. 10 is a block diagram that illustrates features of an embodiment of a mobile authorization service system.

In addition, optionally, as illustrated in FIG. 10, the financial entities or web service providers may want to advertise the applicability and availability of the mobile authorization service 30. The advertisement may be by putting a MAS notation and a logo symbol 354 on a bankcard 350, a check 352, and a web page 356. Such a display of the MAS would indicate to the consumers of the financial entities and the web page merchants that an account with them is protected against fraudulent misuse by MAS 30

As a preferred embodiment, the MAS 216 and 314 of the two systems 200 and 300 may be implemented jointly enabling a single MAS 30, as in FIGS. 2A and 2B to be implemented as described later herein These and other aspects of the embodiments are described here in detail.

As illustrated with the help of FIGS. 2A and 2B, a system of security 10A and a system of security 10B that prevent misuse or abuse of identity data in identity data driven transaction in global commerce via a mobile authorization service is described.

The system 10A as described with reference to FIG. 2A is for those identity data driven transactions that require a financial bank entity that is custodian of a customer's bank accounts to process a request for payment from the customer's bank accounts.

The system 10B as described with reference to FIG. 2B is for those identity data driven transactions that require a data maintainer such as a credit bureau that is custodian of a customer's credit profile data to process a request for release of the credit profile of a customer's profile data. A similar system, not shown could be utilized for release of medical data, financial data, and other personal and private data.

With reference to FIG. 2A, the system of security 10A prevents misuse of identity data of an identity data owner, where an identity data owner and also a payer entity 12, via a payment mechanism 13, such as, a bankcard or a check, submits to a payee entity 14, such as a merchant or a payee, in an identity data driven transaction, the identity data of payer 12, in a global commerce network. The payee's bank 16 receives the identity data, and as the transaction requesting entity sends the request for a payment authorization via a card authorization network or an automated clearing house 20, to the payer's bank 18, the transaction processing entity.

The payer's bank 18, the transaction processing entity, while processing this request for payment or payment authorization puts the request on hold for a brief period of time, and via a mobile authorization system 30, that has a mobile contact database 32 and IVR/SMS subsystem 34, sends a request for authorization of the transaction to the mobile device 36 of the identity data owner, or payer entity 12.

The device 36, displays a Mobile Authorization Service message 37A that may have a security code, a reference number, date and time, and seeks authorization of a specific transaction via a Yes or No or accept/reject response.

A number of prior art protocols and electronic networks facilitate the electronic communication between banks such as the financial transaction originating entity and the receiving bank entity where an account is maintained. There are three different protocols and networks that facilitate the transfer of funds for payment transactions between the originating and receiving financial entities. They are ACH, electronic private network (EPN) and the credit card network.

ACH is provided by Federal bank, EPN is a private operated network and card authorization network is also a private network between card issuing banks. In addition, for debit card transactions, there are one or more EFT networks, operated by private entities. They all operate similarly, where a receiving bank receives a request record for payment authorization of a credit or debit transaction for the account of customers for which it maintains accounts. The receiving bank, upon receiving a payment transaction authorization request record, first checks to see if it can approve the transaction. For example, the receiving bank can reject a transaction if there are insufficient funds to cover the request and also if there is a stop order that has been placed against a particular check. The receiving bank then either accepts or rejects the transaction by using the communication protocol. The protocol enables the rejected transaction to be resubmitted again two times.

Automated Clearing House (ACH) is an electronic network for financial transactions in the United States. ACH processes large volumes of both credit and debit transactions, which are originated in batches. Rules and regulations governing the ACH network are established by NACHA—The Electronic Payments Association (formerly the National Automated Clearing House Association) and the Federal Reserve (Fed).

The operation of ACH is described in detail here for the benefit of the reader. ACH is managed by the NACHA operating rules, which provide for the inter-bank clearing of electronic payments for participating depository financial institutions. The Federal Reserve and Electronic Payments Network act as ACH operators or central clearing facilities through which financial institutions transmit or receive ACH entries.

As illustrated in FIG. 1A, in ACH, an originator 206, which can be an individual or entity, submits a transaction to an Originator 208. The originator 208 is an Originating Depository Financial Institution (ODFI) is a participating financial institution that originates ACH entries at the request of and by ODFI agreement with its customers. ODFI's must abide by the provisions of the NACHA Operating Rules and Guidelines.

Receiving Depository Financial Institution (RDFI) 212 is any financial institution qualified to receive ACH entries that agrees to abide by the NACHA Operating Rules and Guidelines. Receiver 202 is an individual, corporation or other entity that has authorized an Originator 206 to initiate a credit or debit entry to a transaction account held at an RDFI 212.

In accordance to the ACH 210 process, with the rules and regulations of ACH, no financial institution may simply issue an ACH transaction (whether it be a debit or credit) towards an account without prior authorization from the account holder (known as the Receiver 202 in ACH terminology).

An ACH entry starts with a Receiver 202 authorizing an Originator 206 to issue ACH debit or credit to an account. An Originator 206 can be a person or a company (such as the gas company, a local cable company, or one's employer). Depending on the ACH transaction, the Originator 206 must receive written (ARC, POP, PPD), verbal (TEL), or electronic (WEB) authorization 204 from the Receiver 202. Written authorization constitutes a signed form giving consent on the amount, date, or even frequency of the transaction. Verbal authorization needs to be either audio recorded or the "Originator" 206 must send a receipt of the transaction details before or on the date of the transaction. A WEB authorization must include a customer reading the terms of the agreement and typing or selecting some form of an "I agree" statement.

Once authorization is acquired, the Originator 206 then creates an ACH entry to be given to an Originating Depository Financial Institution (ODFI) 208, which can be any financial institution that does ACH 210 origination. This ACH entry is then sent to an ACH 210 Operator (usually the Fed) and is passed on to the Receiving Depository Financial Institution (RDFI) 212, where the Receiver's 202 account is issued either a credit or debit, depending on the ACH transaction.

The RDFI 212 may, however, reject the ACH transaction and return it to the ODFI 208 if, for example, the account had insufficient funds or the account holder indicated that the transaction was unauthorized. An RDFI 212 has a prescribed amount of time in which to perform returns, ranging from 2 to 60 days from the receipt of the ACH transaction. However, the majority of returned transactions are completed within 24 hours from midnight of the day the RDFI 212 receives the transaction.

An ODFI 208 receiving a return of an ACH entry may re-present the ACH entry two more times (three attempts is the maximum allowed) for settlement. Again, the RDFI 212 may reject the transaction, after which, the ODFI 208 may no longer re-present the transaction via the ACH 210.

As described above, the ACH 210 protocol already provides for acceptance or rejection by the receiving bank 212. Further the ACH protocol provides for resubmission of the same transaction by the originator 208, if it was rejected less than two times, enabling a final rejection on the third attempt. The originator 206 is required by law to initiate the transaction only when it has a written authorization. Further the actual bank transfers happen later in time within twenty four hours. As safety measures, in ACH the originator 206 or receiver 202 has up to 60 days to question a transaction on his/her account bank statement.

Such a protocol as ACH 210 may optionally be enhanced to communicate a predefined time delay in acceptance or delayed acceptance, in addition to acceptance and rejection of the transaction immediately by the receiving bank, allowing the receiving bank to seek an authorization by the true identity data owner, the bank account owner. The protocol may indicate that the approval is delayed depending upon the type of the transaction for an authorization beyond checking sufficiency of funds or other issues such as stop payment. The protocol may be based on using the current rejection protocol by adding a time delay to resubmit the transaction. Similar protocols exist in ACH such as one that communicates a stop payment order or insufficient funds as part of the rejection.

As a simplified illustration, when the transaction is first submitted, it may be rejected with a field to indicate that the transaction may be resubmitted a predefined time later. The predefined time may be specified in seconds, or minutes or hours, where such a pre-defined time would be used for a mobile authorization from the identity data owner via the mobile authorization service 30.

Hence depending upon the type of the transaction, real time and almost real time, mobile wireless based authorizations can be obtained from the id data owner. The time it takes the receiving bank to check the status of the flags and send a SMS message is in seconds, and assuming 5 seconds for authorization, the mobile authorization service can provide an authorization within 10 seconds where the authorizer is waiting for the authorization to occur. Where the authorizer is not waiting, the authorization may be delayed by up to 18 hours for next day approval.

Further, the protocol in Internet type computer networks are based on state based transactions and can keep a transaction pending until authorization is obtained or not obtained and then issue an acceptance or rejection as appropriate. For that, a time out limit may be implemented by the ODFI and may be appropriately set. The other two networks, EPN and card authorization networks operate similarly using similar protocols.

The MAS 30 providing real time authorizations provides for safety measures that does not exist in the prior art systems, where unauthorized transactions are handled after they have occurred and are handled manually by the customer receiving a bank statement, reviewing the statement, and then questioning a transaction with his/her bank.

A financial transaction processing entity such as the card issuing bank, may on a request of their customer, and an identity data owner, create a service choice flag, that any request for payment from his/her accounts be authorized by him/her via the mobile authorization service. The flag as a service choice flag providing the option of having this mobile authorization service is described later with reference to FIGS. 4 and 5. When a request for payment is received by the bank, the bank would check this service choice flag and if the flag is set, send a SMS either itself or through a MAS 30 service provider for real time authorization of the transaction to the identity data owner's mobile device 36.

With reference to FIGS. 4 and 5, there may be two different flags in the bank's database. One flag, as described earlier called service choice flag 77, would be used to identify whether a particular customer has chosen to use the MAS 30 or not. A second flag, called enable/disable flag 79, allows the customer that has chosen to use the MAS 30, to enable or disable the MAS for periods of time based on the different modes of use as described here. The bank customer then has the interface to be able to set and reset the enable/disable flag 79. The enable/disable flag 79 may exist at the service provider provided service 30 or the processing entity, the bank 18, itself.

The operation of the second enable/disable flag 79 may best be understood by the following illustrations that describe a proactive mode, a reactive mode, and a combined mode.

In the pro-active mode, the enable/disable flag 79 is left in the enable state all the time. When a transaction is conducted by the identity data owner, the identity data owner would be aware of the transaction and would respond quickly to the mobile authorization request that would require only a minimum acceptable delay in the processing of the transaction. That delay could be in seconds for payment transactions as the identity data owner would be expecting the SMS for authorization and could respond quickly.

In the reactive mode, the enable/disable flag 79 would be left in the disable mode at all times. When a transaction is conducted, the identity data owner would get a real time transaction advisory message. The id data owner can review these transactions and could reject a transaction from final completion, if he/she sends a reject message before expiration of a certain time limit from the time of the transaction origination. The time limit could be in hours and could be up to 18 hours, as the ACH payment systems provide for an actual fund transfer in 24 hours after the payment authorization.

In the combined mode, that combines the features of the pro-active and the reactive mode, the enable/disable flag 79 would be enabled at all times. When the identity data owner is about to conduct a transaction, the enable/disable flag 79 would be disabled with the help of a function key on his/her mobile device and then enabled again with the help of a function key on the mobile device after the payment transaction has been completed. Alternatively a time limit feature in MAS could enable the enable/disable flag after it has been disabled by the help of the function key. As an illustration of the combined mode, an id data owner goes shopping. Before he/she goes to pay, he/she would press a function key on his/her mobile that would disable the enable/disable flag, allowing the transaction to proceed without the mobile authorization process, while he/she would still get the advisory message.

Then, in this illustration, the transaction would be performed without the mobile authorization step, when the identity data owner is aware of and has initiated an identity data driven transaction. After the transaction is completed, then, the id data owner could press another function key to enable the enable/disable flag 79. Alternatively, the enable/disable flag 79 could be automatically enabled after a time out of, let us say five minutes, without the id data owner have to press the second function key.

The combined mode, it is believed would provide the optimum id data abuse protection, while letting the payment systems work as now without the authorization process and let the authorization process kick in for unauthorized or fraudulent transactions. These mode would work equally well for payment authorizations as well as credit profile or other data release transactions.

The system MAS 30 may also have a ping test mode that would send a test message to the mobile wireless device and receive a return response to verify that the MAS features are in an operational state. The ping test may be run periodically by the MAS 30 or it may be run occasionally by the id data owner to assure him/her that the MAS safety features are operative. The ping test may also be used after the account is set up to assure the id data owner and the MAS that the features of MAS are working, as there is encryption and decryption of the messages that is involved in the SMS messages. A function key on the mobile device may be used for the ping test.

The MAS 30 may not be required or necessary for all transactions, such as transactions for small amounts, such as transactions below $10.00 may not require or use mobile authorization service. In these situations, the bank would not contact the identity data owner. Alternatively such a dollar limit can be implemented in the MAS 30 where the id data owner can determine what that limit would be. Letting the id data owner decide the dollar limit can help stop unnecessary mobile authorization messages, based on how an id data owner uses his/her bankcards.

The MAS 30 is not intended to replace or displace any existing fraud detection system the bank may be using but works in addition to those systems. As the bank's existing systems would be operational for all of their customers, whereas the MAS 30 would be operational for those who have chosen this service and would abide by its operation.

Hence, the system 10A has a transaction processing entity 18 in the form of a payer's bank after receiving the identity data driven transaction from a transaction initiating entity or a payee's bank 16 via ACH 20, puts on hold processing of the transaction for a period of time and via the identity data owner's wireless mobile communication device 36, contacts the identity data owner for authorization of the transaction 37A before the transaction processing may be completed. The mobile authorization may be implemented as defined as three operational modes of a proactive mode, a reactive mode and a combined mode.

With reference to FIG. 2B, the system of security 10B prevents misuse of identity data of an identity data owner, where the an identity data owner, also a loan or employment applicant 42, via an application mechanism 43, such as a loan application or employment application, submits to a financial/employer entity 45 an application. The entity 45 directly or an intermediary service provider 46, submits a data release request of credit profile data of applicant 42, in a global commerce network, to a credit bureau or credit rating agency 44. In addition to the credit profile or credit rating data, the data release may also be for release or personal telephone records from a telephone company. There are many other similar applications where a data release may need to be authorized by the id data owner.

The credit bureau 44, while processing this request, puts the request on hold and via a mobile authorization service system 30, with a mobile contact database 32 and IVR/SMS subsystem 34, sends a request for authorization of the transaction to the mobile device 36 of the identity data owner, or applicant 42.

The device 36, displays a Mobile Authorization Service message 37B that may have a security code, a reference number, date and time, and seeks authorization for release of the credit profile to an identified company via a Yes or No or accept/reject response.

A credit bureau may upon a request of a data owner, create a service choice flag in its own database where any release of id data be authorized by him/her via the mobile authorization service. When a request is received, the bureaus would check the service choice flag and sends an SMS either themselves or though a service provider 30 for real time authorization for the data release request.

Since, credit agencies 44 generate revenue by providing credit data to their known customers such as banks with pre-existing contractual relationships, the credit agency may choose to not have these requests be authorized through the MAS 30.

The system of security 10A or 10B in an identity data driven transaction may include identity data driven transactions from a group of (i) credit card payment, (ii) bank account payment, (iii) release of credit profile, (iv) release of financial data, (v) release of medical data, and (vi) release of personal private data that may be governed by privacy rules.

The mobile device authorization service system 30 of the system 10A or 10B reduces the need for identity data authorizations for the identity data driven transaction at the transaction initiating entities that require a signature, and additionally a proof of identity.

Hence, the system 10B has a transaction processing entity 44 in the form of a credit data profiler which after receiving the identity data driven transaction from a transaction initiating entity 45, puts on hold processing of the transaction for a period of time and via the identity data owner's wireless mobile communication device, contacts the identity data owner for authorization of the transaction before the transaction processing is completed.

In another embodiment, where the Mobile Authorization Service (MAS) is independent of the bank and the credit agency, in the role of a service provider to them, the system for a wireless mobile device based authorization security service contacts identity data owners via their wireless mobile devices to authorize identity data driven transactions, while they are being processed by a transaction processing entity, so that in a global commerce network, the system prevents misuse of personal identity data of an identity data owner.

In the system 10A and 10B, a service provider may manage the mobile authorization service system 30 and may manage a database of mobile contact information 32 and the corresponding mapping of identity data and provides a service to the transaction processing entities that facilitates the contact with the identity data owner for the authorizations.

The authorization contact by the transaction processing entity with the id data owner via the MAS 30 and via the owner's wireless mobile communication device may include a SMS text message. The message may embed a pre-placed security code, so that the identity data owner would know and can assure him/herself that the MAS 30 originated the SMS message. The security code may be an alphanumeric or a personal phrase that is easily recognizable by the id data owner.

The SMSs are the most viable, quickest, stable, and widely used message protocol for such applications as the mobile authorization service. The SMS addressing is tied to the mobile phone number. Such phone numbers are portable and remain same when the mobile device is upgraded or the telephone carrier is switched to another carrier. SMS are global in scope and are in wide spread use globally. However in the future other different or improved protocols may be used and are not ruled out.

The authorization message 37A, 37B from the MAS 30 as illustrated in FIGS. 2A and 2B may include sending to the identity data owner, (i) name of the transaction initiating entity, date and time, and optionally an amount for a payment transaction. The authorization may include accept, reject or time out due to lack of response, where the time out is set based on the type of the transaction. Further the contents of the SMS may be encrypted between the mobile device 36 and the MAS 30 using any number of prior art encryption technologies.

As described earlier, the MAS 30 may have an enable/disable flag 79 that disables the MAS system for periods of time. When the enable/disable flag is disabled, the MAS can let the process entity process the transaction without waiting for an accept/reject message from the mobile authorization service. Further, the system 30 logs an authorization event in an event log database for use as an authorization record of the transaction.

The system 30 has a database of mobile identity that maintains mapping of the mobile contact information with identity data of the identity data owner. The identity data would be from a group of (i) social security number, (ii) bankcards, (iii) bank account numbers, (iv) name, (vi) date of birth, and (vii) zip code. The MAS 30 has a function to receive a request for mobile authorization from a transaction processing entity that would be one from a group of (i) a bank with a bank account information, (ii) a bank with bankcard information, (iii) a credit rating agency, with a social security number, (iv) a medical service provider with name, DOB and zip code, a telephone company, and a similar personal and id data holder.

Alternatively, as illustrated in FIGS. 4 and 5, a unique customer identifier 75 may be used in place of all the customer identity data that may be used to identity the customer in the MAS by the bank, the credit agency or the other data agencies. Then the MAS database would only need to maintain mobile contact information and its mapping to the customer identifier 75, without the need to require and store identity data. A unique customer identifier 75 may be based on some combination of name, address and telephone number, or may be an alphanumeric.

Figure 3:
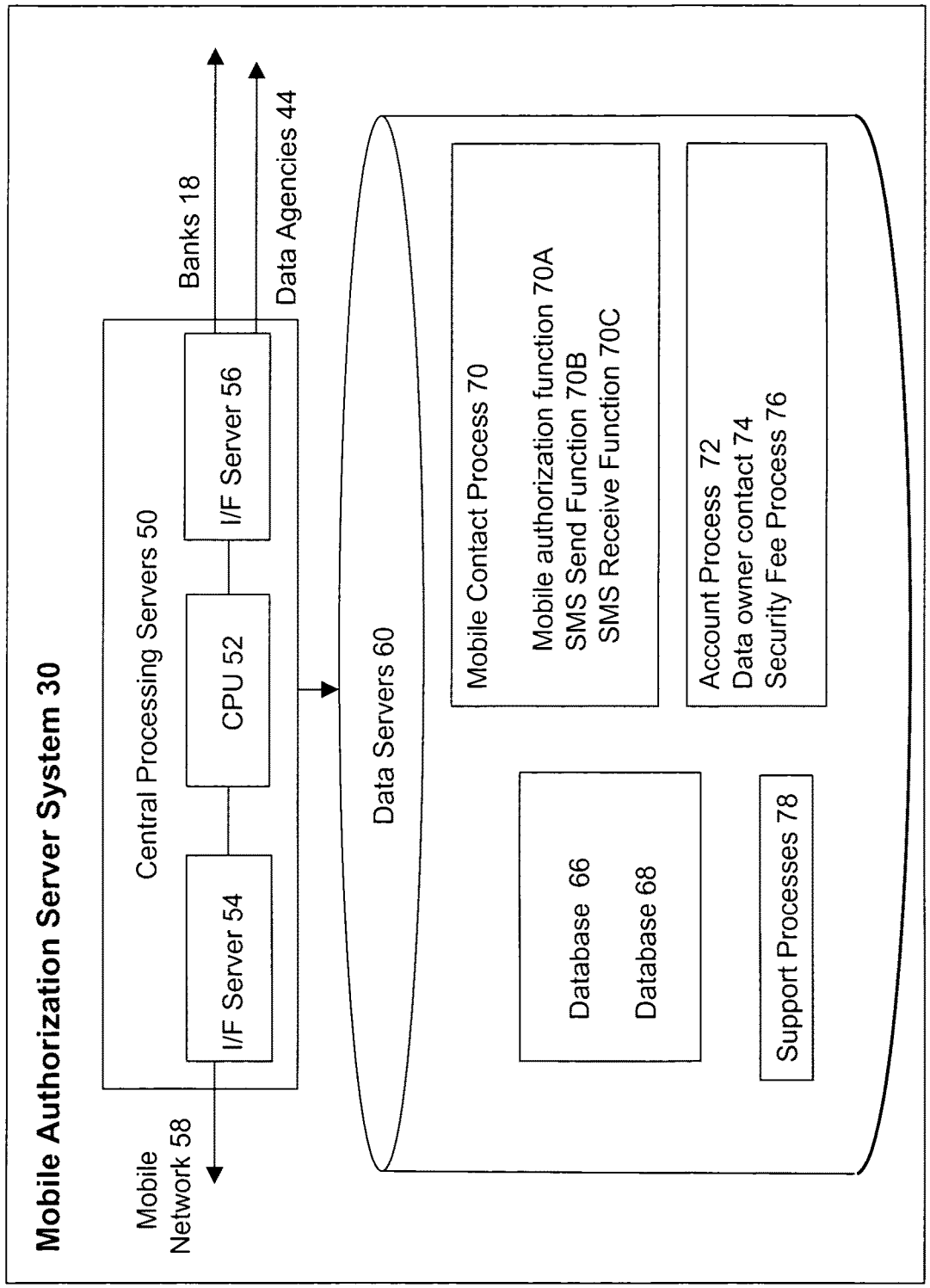
FIG. 3 is a block diagram that illustrates features of the present preferred embodiment of the mobile authorization service.

As shown in FIG. 3, the MAS 30 has a mobile contact process 70 that includes a mobile authorization function 70A, a SMS send function 70B, and a SMS receive function 70C.

The mobile authorization function 70A has functions (i) to receive a mobile authorization request from a transaction processing entity, (ii) map the request to an existing record in the database 32 by mapping the identity data or the unique customer identifier, (ii) look up the enable/disable flag status for this particular identity data owner, (iii) then subsequently look up the identity data owner's mobile contact information.

The MAS 30 has a SMS send function 70B (i) to then create an SMS message embedded with the data as 37A for a payment transaction authorization or 37B for a data release authorization, (ii) then optionally encrypt the SMS data with a pre-placed and unique key between the MAS 30 and the mobile device 36, (iii) create a time out counter based on the type of the transaction, and (iv) then send the SMS via the mobile contact information to the mobile device seeking authorization of the transaction.

The MAS 30 also has a SMS receive function 70C (i) to receive a SMS reply response from the mobile device 36 (ii) identify the response by matching the response in the database 32, and (iii) optionally decrypt the response. The system 30 may have a pre-set security code between the mobile device owner and the mobile authorization service to authenticate mobile authorization responses.

The MAS 30 has a mobile authorization function 70A further provides the functions of, (iv) to then forward the response to the transaction processing entity 18, and (v) create an event log.

The MAS 30 has an account process 72 that enables an identity data owner to create accounts via the database 32, where the relevant account data would be stored in databases 32. The relevant account data may include, name, address, mobile contact information, payment methods for the service etc. In addition, a similar account process (not shown) may be used to set up an account for the transaction process entities. A separate database may be used for this purpose. Not all databases are shown in FIG. 3.

The MAS 30 may also have data owner contact process 74 that enables the MAS 30 to contact the data owner and to verify the mobile contact information by a number of means such as, audio voice calls, e-mail or ground mail, as well as for creating the security code and pre-placing an encryption key and encryption mechanism.

As illustrated with reference to FIG. 9, the mobile device 36 that works in conjunction with the MAS 30 may have a mobile authorization function that enables the mobile device 36 to be customized to receive SMS authorization request messages from the MAS 30 and be able to respond to such authorization SMSs by function keys. The authorization request message may be for a payment transaction 37A, or for a data release transaction 37B, or it may be for a payment advisory message 37C. The device 36 owner may respond to message types 37A and 37B by using a pair of function keys 165 and 169, where the pair of function keys would automatically embed a return SMS with either an accept or reject code, encrypt the SMS and send the SMS to the mobile authorization system 30.

The mobile authorization function of the device 36 may have an additional function key 167 that would disable and then enable the enable/disable flag 79. A function key (not shown) may also be used to perform a ping test by which test messages may be sent and received to and from the MAS 30. The results of the test message 37D would be to confirm to the device 36 owner that the MAS 30 is functional.

As an optimum or simpler solution for some or many id data owners for using the MAS 30, there may be only two function keys on the mobile device 36. One function key would be used to temporarily disable the enable/disable flag 79 before a know transaction is begun or initiated. A time out feature in MAS 30 would again enable the enable/disable flag 79. A second function key would be used for the ping test.

Hence the system of security that prevents misuse of identity data of an identity data owner in an identity data driven transaction in a global commerce network, the system has wireless mobile device 36 of an identity data owner, where the mobile wireless device 36 has security means to securely receive a mobile authorization message requesting authorization of an identity data driven transaction from a mobile authorization service 30. The mobile device 36 has means to reply to the transaction authorization message with either an accept or a reject return response message. Alternatively or in addition the mobile device 36 has means to securely receive transaction advisory messages and be able to timely send stop transaction order messages for those transactions that are unauthorized.

The device 36 has an accept function key and a reject function key, which when activated launches a function in the device to return the appropriate accept and reject response return message.

The system 30 may have a security fee process 76 which is used to levy a fee to support the operation of the MAS 30. The security fee may be levied to the bank and the credit agency for the service of obtaining authorization via a mobile contact of the customer. Alternatively, the system 30 may levy the security process fee directly on the identity data owner, or a combination of both based on the benefit provided to each of them.

As in FIG. 3, a mobile authorization service system 30 has a set of central processing units (CPUs) servers 50 that have a interface server 54 that interfaces with the mobile wireless network 58, interface server 56 that interfaces with the banks 18 and the data agencies 44 via a global network. The interface servers 54 would also provide the subsystems for SMS and interactive voice response (IVR)) that would interface with the wireless cellular telephone network. The CPU servers 50 interface with data servers 60. The data servers 60 maintain database 66 and database 68, as described with reference to FIG. 4. These databases enable MAS 30 to function as a service provider system. Alternatively, and as described with reference to FIG. 5, when the MAS functions as a captive system for the transaction processing entities, the data servers may maintain databases as either table 81 or as table 82. Tables 81 and table 82 would enable the MAS 30 to function as a captive system for each type of transaction processing entity such as for payment transactions or for data release transactions.

The data servers 60 also store process programs that execute the functions of the MAS 30. These may include the mobile contact process 70, the account process 72, the data owner contact process 74, and the security fee process 76. Additionally, the support processes 78 supports the overall operation of the mobile authorization service system 30.

As shown in FIGS. 2A and 2B, the MAS 30 also has an IVR/SMS subsystem 34 that interfaces with the wireless network to be able to send and receive SMS messages. The interactive voice response (IVR) system may be used by the identity data owners to set up the account with the MAS 30. Any other method, such as US mail or web transaction may also be used to set up the account.

With reference to FIG. 4, the database 66, maintains data fields of a serial number (S/N), a unique customer identifier 75, a mobile number, optionally a social security number, customer contact information such as name, address etc., a service choice flag 77, an enable/disable flag 79 and a security code 80, where database 66 would support the mobile authorization service for the data release transaction such as credit data agencies, and where the social security number may function as the connecting reference between the credit data agencies own systems that maintain customer data and the MAS 30. Alternatively, the unique customer identifier 75 may also serve as the linking reference, in lieu of the social security number, when the service provider 30 is separate and independent from the credit data agencies. The database may also have a encryption code key (not shown)

Also with reference to FIG. 4, the database 68, maintain data fields of a serial number (S/N), a unique customer identifier 75, a mobile number, optionally bankcards and bank account data, contact information that may include name and address etc., a service choice flag 77, an enable/disable flag 79 and a security code 80, and where database 68 would support the mobile authorization service for the banks, where the bankcard or the bank account number may function as the connecting reference between the banks' own systems that maintain customer data and the MAS 30. Alternatively, the unique customer identifier 75 may also serve as the linking reference, in lieu of the bank account number, when the service provider 30 is separate and independent from the bank. A unique customer identifier 75 would be a preferred choice as it would be the same for a customer irrespective of bank accounts at different banks and credit profile at different credit bureaus.

With reference to FIG. 5, a data agency 44 would maintain a table 81 that provides for a service choice flag 77 of yes/no anchored to its own customer identifying data. The table 81 may also have an enable/disable flag 79, enabling the identity data owner to enable/disable the operation of the mobile authorization service for period of time. Also with reference to FIG. 5, a bank 18 would maintain a table 82 that provides for a service choice flag 77 of yes/no anchored to its own customer identifying data of bank account data. The table 82 may also have an enable/disable flag 79, enabling the identity data owner to enable/disable the operation of the mobile authorization service for period of time. Alternatively, the bank or the credit data agency may chose to use an independent service provider MAS 30. When the MAS 30 is used, the bank and the credit agency tables 81 and 82 need not maintain the enable/disable flag 79, as that would be maintained by the MAS 30, as illustrated earlier with reference to FIG. 4.

Figure 6:
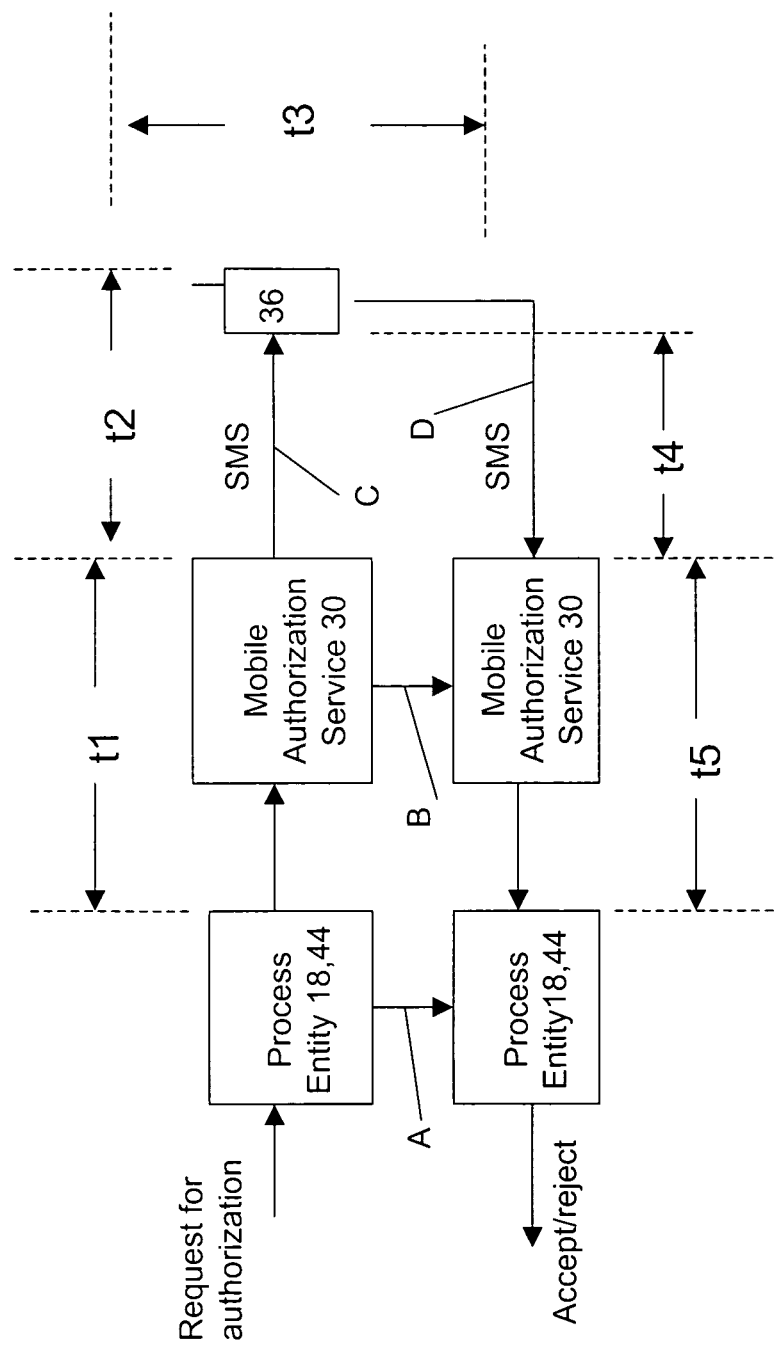
FIG. 6 is a data flow diagram that illustrates features of the present preferred embodiment of a mobile authorization service system.

FIG. 6, illustrates the various data flow paths and the use of the service choice flag 77 and the enable/disable flag 79. When a process entity 18, 44 receives a request for authorization, and when the service choice flag 77 is not set, it can check the request and process by itself and send out a accept/reject response as in data path A.

When the service choice flag 77 is set, the process entity 18, 44, sends the request to MAS 30. However, if the dollar amount in a payment transaction is less than a threshold, such as ten dollars, the process entity may not send the request to MAS 30. Also however, if the requester is a pre-contracted or pre-authorized business, such as a card issuing bank with need to check credit status on a periodic basis or it the payee has an authorized monthly payment account then the process entity 18, 44 may also not send the request to MAS 30. Since the MAS 30 in addition to an authorization system also functions as an advisory system, all transactions may be sent to MAS 30, where MAS 30 can decide which transactions would be advisory to the mobile device owner and which ones would require his/her acceptance of the transaction.

After MAS 30 receives transaction requests from the process entity 18, 44, MAS 30 checks to see if the enable/disable flag 79 is set. If the flag 79 is set enable, then MAS 30 sends out a request to approve the transaction SMS to mobile device 36 via data path C. The mobile device owner views the SMS request and sends accept/reject return SMS via data path D to the MAS 30. The MAS 30 then sends an accept/reject record to the process entity 18, 44.

If the flag 79 in the MAS 30 is disabled, MAS 30 sends an advisory SMS via path C to mobile device owner 36 and also sends an accept response via data path B to the process entity 18, 44.

As illustrated in FIG. 6, it is estimated that the time delay in data flow path A to be the order of a second. The time delay in data path B plus C is t1+t2+t5, it is believed, may be of the order of a second. The time delay in data path C plus D would be (t1+t2+t3+t4+t5) where t3 is dependent upon the mobile device 36 owner's response. When the mobile device 36 owner is waiting for the authorization request it is estimated for the t3 to be less than five seconds. When the mobile device 36 owner is not waiting for the authorization request, the time t3 may be up to 18 hours, enabling an overnight authorization.

As a simplified illustration, if the id data owner wrote checks and mailed to a business. The business would process the check and then submit them to business's or payee's bank. The payee's bank would then submit them via ACH to the payer or data owner's bank. The payer or receiver bank may process the request in the night time, where the SMS would be sent in the night. So that the mobile device 36 owner can read the SMS the next day and provide an accept/reject authorization. Alternatively, when the bank account payment is via online, the authorization may happen immediately.

As has been described earlier, a proactive mode would use the data paths C and D, and a reactive mode would use the data paths B and C. A combined mode would use the data paths B, C, and D, and the combined mode would let the authorized payment transactions to be processed normally without any delay and with an advisory message and would let the fraudulent or unauthorized transactions to be proactively rejected, as they would not be accepted.

FIG. 7A identifies the method process for mobile authorization process that is managed by the banks themselves. Also FIG. 7B identifies the method process for mobile authorization process that is managed by the data agencies themselves. FIG. 8 identifies mobile authorization process that is provided by an independent mobile authorization service 30.

As illustrated in FIGS. 7A-B and 8, the method steps are defined below. Not all steps may be used or used in the order specified.

As in FIG. 7A, a method of preventing misuse of bankcard data for an unauthorized payment transaction may have the steps of:

At step 100, receiving, by a financial entity which maintains accounts of a customer, (i) a bankcard originated payment authorization request from a merchant point of sale, via a card authorization network and (ii) a payee originated request for payment via an ACH.

At step 102, check if the identity data owner has selected mobile authorization service by a service flag status.

At step 104, putting on hold, by the financial entity, the processing of the payment authorization request for a period of time enabling contacting the customer via a wireless mobile device of the customer, with information about the payment authorization request and requesting a response with a timer to proceed with the payment authorization;

At step 106, sending the SMS authorization request to the identity data owner via his/her wireless mobile device.

At step 108, awaiting the response by the entity from the customer for a period of time, and processing the response, where on receiving (i) a yes response approving the request, (ii) on receiving a No response declining the request and (iii) for lack of response, advising the requesting entity to present the request at a later time.

At step 110, selecting and setting the period of time of response threshold based on the type of the payment request, the identification of the requesting entity, and originating location of the request, to be between 30 seconds and 18 hours.

At step 112, processing the request for payment without contacting the customer, if the payment amount does not exceed a set amount.

At step 114, eliminating signature and identity proof for a request for payment originating in the form of a credit card transaction;

At step 116, eliminating entry of a PIN for a payment request originating in the form of a check card transaction from a checking account.

At step 118, contacting the customer is in the form of a SMS text message delivered to the mobile phone, requesting a response by pressing a function key, enabling Yes/No response to be automatically sent by the mobile phone, for a return response.

At step 120, levying a security fee for providing the security service of preventing misuse of bankcard, where the fee may be in the form of annual fee or a per transaction fee built into the mobile contact means.

AS in FIG. 7B, a method of preventing misuse of identity data comprising the steps of:
At step 122, receiving by a credit rating agency a credit profile request from a financial entity for a loan applicant customer and from an entity for an employment applicant customer for character reference;
At step 124, putting on hold, by the credit profile agency, the processing of the profile request for a period of time enabling contacting the customer via a wireless mobile device of the customer, with information about the profile request and requesting a response to proceed with the profile release authorization;
At step 126, awaiting the response by the credit agency from the customer for a period of time, and processing the response, where on receiving a Yes response approving the request, on receiving a No response declining the request and for lack of response, advising the requesting entity to present the request at a later time, thereby eliminating the need of obtaining a written authorization from the identity data owner for release of private data.

The MAS 30 provides for interfaces and interactions between the id data owner and the process entity. The method steps for these interfaces and actions are described with reference to the method diagram in FIG. 8. Not all the steps may be used or used in the order as here, are as follows:

At step 140, an identity data owner is concerned for misuse of his id data, and decided to use MAS service for a service fee, for his/her piece of mind.

At step 142, Id data owner opens an account with the MAS by providing mobile contact and other basic information that supports identity verification.

At step 144, Id data owner authorizes MAS as its agent to require id data transaction processing entities to contact MAS for authorizations on his/her accounts.

At step 146, MAS verifies the identity and creates an account with a customer identifier.

At step 148, MAS contacts the various process entities which maintain customer bank data and credit data.

At step 150, Process entities amend their system by adding MAS provided customer identifier, a service choice flag, and by establishing an interface with the MAS.

At step 152, Id data owner has the ability to interact with the MAS via secure means to turn MAS enable/disable flag on/off.

At step 154, process entity receives a transaction and checks service choice flag.

At step 156, process entity interfaces with the MAS by sending a record, having, customer identifier, nature and type of transaction and request entity identification.

At step 158, MAS receives the record, and searches the customer identifier and finds the customer mobile contact information. MAS checks enable/disable flag.

At step 160, if enabled, MAS forms a mobile authorization record, initiates a timer, and sends a SMS to id data owner mobile device. If disabled, MAS sends an advisory SMS.

At step 162, If flag is enable, MAS waits for a return response and creates an accept/reject record for the process entity and sends the record to the process entity.

At step 164, MAS makes a log event record of the process.

In summary, the preferred embodiment provides a system of security that prevents misuse of identity data of an identity data owner in an identity data driven transaction in a global commerce network. In the system, a transaction processing entity, after receiving the identity data driven transaction from a transaction initiating 10 entity, puts on hold processing of the transaction for a period of time and via the identity data owner's wireless mobile communication device, contacts the identity data owner for authorization of the transaction before the transaction processing is completed. In the preferred embodiment, a single system would stop misuse and abuse of the identity data after it has been stolen or presumed stolen in a range of transactions both for payment transactions and data release transactions and would thus provide a solution for this intractable problem that has touched the lives of so many based on many news items and FTC records.

While the particular preferred embodiment, as illustrated herein and disclosed in detail is fully capable of obtaining the objective and providing the advantages herein before stated, it is to be understood that it is merely illustrative of the presently preferred embodiments and that no limitations are intended to the details of construction or design herein shown other than as described in the appended claims.

What is claimed is:

1. A system of security for an identity data owner in an identity data driven transaction at financial institutions in a global commerce network, the system of security comprising:
a mobile authorization system (MAS), wherein the MAS comprises a MAS processor, a logic, and a database server, wherein the logic is stored and executed in the MAS processor, wherein the database server has a database, wherein the database comprises mobile identities that maintains mapping of mobile contact information with identity data of identity data owners, including a unique identifier for the identity data owner utilized for the identity data driven transaction, wherein the MAS processor has wireless network interfaces with wireless mobile devices of the identity data owners;
wherein the MAS processor comprises interfaces with the financial institutions, wherein, in response to receiving a request for fund transfer at a financial institution via the identity data driven transaction, the identity data driven transaction comprising a credit card payment, a debit card payment, or a bank account payment, the MAS processor is configured to:
receive, from the financial institution, over one or more interfaces, records of the request for fund transfer received at the financial institution;
determine that a status of a stored authorization service flag is set to enable;
wirelessly forward notifications, via a short messaging system (SMS) message, to a wireless mobile device of the identity data owner, using the mobile contact information stored in the database and including in the SMS message an embedded pre-placed security code recognizable by the identity data owner, seeking an authorization of the transaction, and the notifications include at least names of payees; and
wait an amount of time to receive the authorization from the wireless mobile device of the identity owner; and
communicate the authorization to the financial institution to allow the transaction to be processed upon receiving the authorization from the identity data owner without receiving any of the other identity data, wherein the transaction is based on the identity data corresponding to the unique identifier, stored in the database.

2. The system of security as in claim 1, wherein:
the MAS processor is configured to authorize the identity data driven transaction by the identity data owner without a password.

3. The system of security as in claim 1, wherein:
the amount of time is configured to be a time period between 5 seconds and 18 hours, dependent on a type of transaction.

4. The system of security as in claim 1, wherein:
the MAS processor has the database of the mobile contact information including mobile wireless telephone numbers and the corresponding mapping of identity data and is configured to provide to the financial institutions mobile authorization contact with the identity data owner for the transaction authorizations.

5. The system of security as in claim 1, wherein:
the MAS processor is configured to send to the identity data owner on the mobile wireless device, date and time, and an amount for a payment transaction via the SMS message.

6. The system of security as in claim 1, wherein:
the MAS processor is configured to receive a mobile authorization response from the id data owner's mobile wireless device to include one of, an accept, a reject or a time out due to lack of response, where the time out is set based on the type of the transaction.

7. The system of security as in claim 1, wherein:
the stored authorization service flag is an enable/disable flag, wherein the MAS processor sends an advisory message to the id data owner on the mobile wireless device for the transaction when the flag is disabled.

8. The system of security as in claim 1, wherein:
the MAS processor is configured to log an authorization event in an event log database for use as an authorization record of the transaction.

9. A system of security for an identity data owner in an identity data driven transaction at data aggregators in a global commerce network, the system of security comprising:
a mobile authorization system (MAS), wherein the MAS comprises a MAS processor, a logic, and a database server, wherein the logic is stored in and executing in the MAS processor, wherein the database server has a database, wherein the database comprises mobile identities that maintains mapping of mobile contact information with identity data of identity data owners, including a unique identifier for the identity data owner utilized for the identity data driven transaction wherein the MAS processor has wireless network interfaces with wireless mobile devices of the identity data owners;
wherein the MAS processor comprises interfaces with the data aggregators, wherein, in response to receiving a request for data access at a data aggregator via the identity data driven transaction, the MAS processor is configured to:
receive, from the data aggregator, over one or more interfaces, records of the request for data access received at the data aggregator,
determine that a status of a stored authorization service flag is set to enable;
wirelessly forward notifications, via a short messaging system (SMS) message, to a wireless mobile device of the identity data owner, using the mobile contact information stored in the database and including in the SMS message an embedded pre-placed security code recognizable by the identity data owner, seeking an authorization of the transaction, the notifications include at least names of requestors of data access transaction requests; and
wait an amount of time to receive the authorization from the wireless mobile device of the identity owner; and
communicate the authorization to the financial institution to allow the transaction to be processed upon receiving the authorization from the identity data owner without receiving any of the other identity data, wherein the transaction is based on the identity data corresponding to the unique identifier, stored in the database.

10. The system of security as in claim 9, wherein:
the identity data driven transaction is one of release of credit profile, release of financial data, release of medical data, and release of any private data that is governed by privacy rules.

11. The system of security as in claim 9, wherein:
the MAS processor is configured to authorize the identity data driven transaction by the identity data owners without a password.

12. The system of security as in claim 9, wherein:
the amount of time is configured to be a time period between 5 seconds and 18 hours, dependent on a type of transaction.

13. The system of security as in claim 9, wherein:
the MAS processor has the database of the mobile contact information including mobile wireless telephone numbers and the corresponding mapping of identity data and is configured to provide to the data aggregators the mobile authorization contact with the identity data owner for the transaction authorizations.

14. The system of security as in claim 9, wherein:
a mobile authorization request SMS message by the MAS processor is configured to send to the identity data owner on the mobile wireless device, name of data requestors, date and time of the request.

15. The system of security as in claim 9, wherein:
the MAS processor is configured to receive a mobile authorization response from the id data owner's mobile wireless device to include one of, an accept, a reject or a time out due to lack of response, where the time out is set based on the type of the transaction.

16. The system of security as in claim 9, wherein:
the stored authorization service flag is an enable/disable flag, wherein the MAS processor sends an advisory message to the id data owner on the mobile wireless device for the transaction only when the flag is disabled.

17. The system of security as in claim 9, wherein:
the MAS processor is configured to log an authorization event in an event log database for use as an authorization record of the transaction.

18. A method of security for an identity data owner in an identity data driven transaction at financial institutions in a global commerce network, the method of security comprising steps of:
providing a mobile authorization system (MAS), wherein the MAS comprises a MAS processor, a logic, and a database server, wherein the logic is stored in and executing in the MAS processor, wherein the database server has a database, wherein the database comprises mobile identities that maintains mapping of the mobile contact information with identity data of identity data owners, including a unique identifier for the identity data owner utilized for the identity data driven transaction, wherein MAS processor has wireless network interfaces with wireless mobile devices of the identity data owners; and
providing by the MAS processor interfaces with the financial institutions, wherein, in response to receiving a request for fund transfer at a financial institution via an identity data driven transaction, the identity data driven transaction comprising a credit card payment, a debit card payment, or a bank account payment, the MAS processor is configured for:
receiving, from the financial institution, over one or more interfaces records of the request for fund transfer received at the financial institution;
determining that a status of a stored authorization service flag is set to enable;
wirelessly forwarding a notifications, via a short messaging system (SMS) message, to a wireless mobile device of the identity data owner, using the mobile contact information stored in the database and including in the SMS message an embedded pre-placed security code recognizable by the identity data owner, seeking an authorization of a transaction, and the notifications includes at least a name of a payee;
wait an amount of time to receive the authorization from the wireless mobile device of the identity owner; and
communicating the authorization to the financial institution allowing the transaction to be processed upon receiving the authorization from the identity data owner without receiving any of the other identity data, wherein the transaction is based on the identity data corresponding to the unique identifier, stored in the database.

19. The method of security as in claim 18, further comprising steps of:
not needing by the MAS processor authorizations for the identity data driven transaction by the identity data owners that require a signature, and additionally a proof of identity or a password PIN.

20. The method of security as in claim 18, further comprising steps of:
configuring the amount of time to be a time period between 5 seconds and 18 hours, dependent on a type of transaction.

21. The method of security as in claim 18, further comprising steps of:
providing by the MAS processor the database of the mobile contact information including mobile wireless telephone numbers and the corresponding mapping of identity data and providing to the financial institutions the mobile authorization contact with the identity data owner for the transaction authorizations.

22. The method of security as in claim 18, further comprising steps of:
including in a mobile authorization request SMS message by the MAS processor and sending to the identity data owner on the mobile wireless device, date and time, and an amount for a payment transaction.

23. The method of security as in claim 18, further comprising steps of:
receiving by the MAS processor a mobile authorization response from the id data owner's mobile wireless device to include one of, an accept, a reject or a time out due to lack of response, where the time out is set based on the type of the transaction.

24. The method of security as in claim 18, further comprising steps of:
providing by the MAS processor the stored authorization service flag which is an enable/disable flag, and
sending an advisory message to the id data owner on the mobile wireless device for the
transaction when the flag is disabled.

25. The method of security as in claim 18, further comprising steps of:
logging by the MAS processor an authorization event in an event log database, and
saving the authorization event as an authorization record of the transaction.

26. A method of security for an identity data owner in an identity data driven transaction at data aggregators in a global commerce network, the system of security comprising steps of:
providing a mobile authorization system (MAS), wherein the MAS comprises a MAS processor, a logic, and a database server, wherein the logic is stored in and executing in the MAS processor, wherein the database server has a database wherein the database comprises mobile identities that maintains mapping of the mobile contact information with identity data of identity data owners, including a unique identifier for the identity data owner utilized for the identity data driven transaction wherein the MAS processor has wireless network interfaces with wireless mobile devices of the identity data owners; and providing by the MAS processor interfaces with data aggregators, wherein, in response to receiving a request for data access at a data aggregator via an identity data driven transaction:

receiving by the MAS processor from the data aggregator, over one or more interfaces, records of the request for data access received at the data aggregator;

determining that a status of a stored authorization service flag is set to enable;

wirelessly forwarding notifications to a wireless mobile device of the identity data owner using the mobile contact information stored in the database and including in the SMS message an embedded pre-placed security code recognizable by the identity data owner, seeking an authorization of the transaction, and the notifications include at least names of requestors of data access transaction requests;

wait an amount of time to receive the authorization from the wireless mobile device of the identity owner; and communicating the authorization to the financial institution to allowing the transaction to be processed upon receiving the authorization from the identity data owner without receiving any of the other identity data, wherein the transaction is based on the identity data corresponding to the unique identifier, stored in the database.

27. The method of security as in claim 26, further comprising steps of:

including in the identity data driven transaction one of release of credit profile, release of financial data, release of medical data, and release of any private data that is governed by privacy rules.

28. The method of security as in claim 26, further comprising steps of:

not needing by the MAS processor signature authorizations for the identity data driven transaction by the identity data owners.

29. The method of security as in claim 26, further comprising steps of:

configuring the amount of time to be a time period between 5 seconds and 18 hours dependent on a type of transaction.

30. The method of security as in claim 26, further comprising steps of:

providing by the MAS processor the database of the mobile contact information including mobile wireless telephone numbers and the corresponding mapping of identity data and providing to the data aggregators the mobile authorization contact with the identity data owner for the transaction authorizations.

31. The method of security as in claim 26, further comprising steps of:

including in a mobile authorization request SMS message by the MAS processor and sending to the identity data owner on the mobile wireless device, date and time of the request.

32. The method of security as in claim 26, further comprising steps of:

receiving by the MAS processor a mobile authorization response from the id data owner's mobile wireless device to include one of, an accept, a reject or a time out due to lack of response, where the time out is set based on the type of the transaction.

33. The method of security as in claim 26, further comprising steps of:

providing by the MAS processor the stored authorization service flag which is an enable/disable flag, and sending an advisory message to the id data owner on the mobile wireless device for the transaction when the flag is disabled.

34. The method of security as in claim 26, further comprising steps of:

logging by the MAS processor an authorization event in an event log database, and saving the authorization event as an authorization record of the transaction.

* * * * *